Dec. 13, 1955     A. J. LEWUS     2,727,198

SINGLE PHASE INDUCTION MOTORS

Filed April 5, 1954     2 Sheets-Sheet 1

INVENTOR.
Alexander J. Lewus
BY
Smith, Olsen, Baird & Gulbrandsen
Attys.

Dec. 13, 1955  A. J. LEWUS  2,727,198
SINGLE PHASE INDUCTION MOTORS
Filed April 5, 1954  2 Sheets-Sheet 2
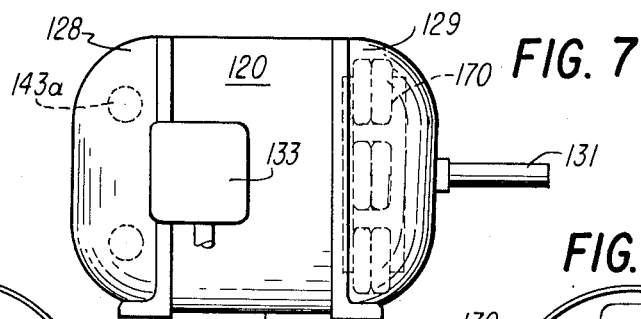
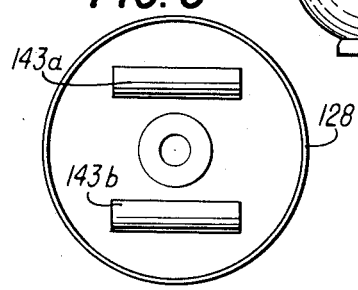
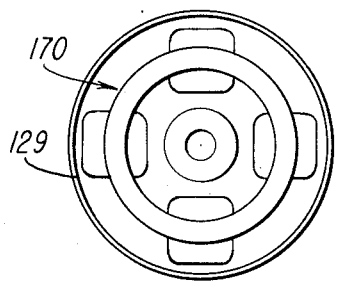
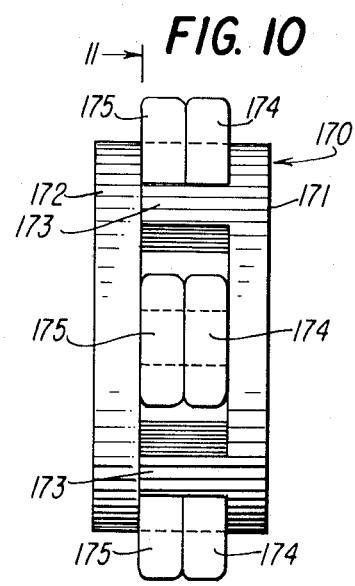
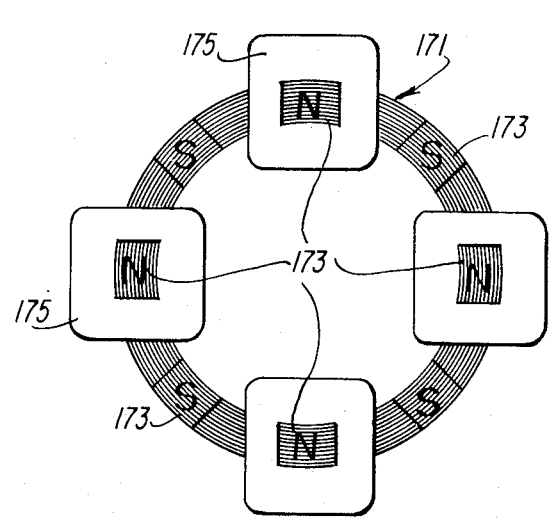
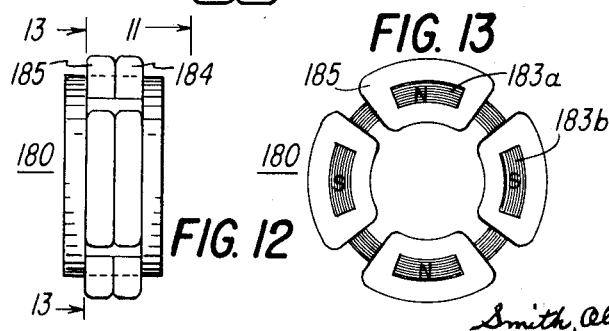
INVENTOR.
Alexander J. Lewus United States Patent Office 2,727,198
Patented Dec. 13, 1955

2,727,198

SINGLE PHASE INDUCTION MOTORS

Alexander Jay Lewus, Cicero, Ill.

Application April 5, 1954, Serial No. 420,769

7 Claims. (Cl. 318—220)

The present invention relates to induction motors, and more particularly to improved induction motors of the character disclosed in the copending application of Alexander J. Lewus, Serial No. 360,798, filed June 10, 1953.

In the Lewus application mentioned, there is disclosed the combination of an induction motor including a stator provided with angularly displaced main and auxiliary windings and a rotor provided with a squirrel-cage winding, a transformer including a saturable magnetic core provided with primary and secondary windings, a capacitor, and a circuit network including a primary circuit and a secondary circuit. In the circuit network, the primary circuit is connectible to a single-phase alternating current supply source and includes in series relation the main winding and the primary winding, and the secondary circuit is fixed and includes in series relation the auxiliary winding and the secondary winding and the capacitor. In the circuit network, proper starting and running conditions are automatically obtained, so that it is unnecessary to switch the fixed secondary circuit between starting and running connections, or otherwise to alter the circuit network to effect proper starting and running of the rotor in an efficient manner.

In the combination, it was contemplated that the transformer and the capacitor would be carried by an external support, or mounted upon the outside of the frame or casing of the induction motor.

It has now been discovered that either of the mounting arrangements mentioned leads to complicated and expensive wiring, as well as to an installation that is not compact and efficient.

Accordingly, it is a general object of the present invention to provide the combination of the character noted, that is of simple and compact construction and arrangement, and that is of unitary character.

Another object of the invention is to provide in the combination of the character noted, an improved arrangement of the elements so that the transformer and the capacitor are housed within the casing of the induction motor in order that they are protected against accidental injury, and so that a simple and compact circuit network is provided for all of the operative elements of the combination.

A further object of the invention is to provide the induction motor combination of the character noted, wherein the motor casing includes removable end bells, and wherein the transformer and the capacitor are housed in one of the end bells and directly supported thereby, so that the one end bell and the transformer and the capacitor carried thereby are removable as a unit with respect to the remainder of the casing.

Still a further object of the invention is to provide the induction motor combination of the character noted, wherein one or both the transformer and the capacitor are arranged in sections in one or both of the end bells, so as to achieve both compactness and favorable distribution, while retaining adequately large sizes for efficient operation and cooling.

Further features of the invention pertain to the particular arrangement of the elements of the induction motor, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 7 is a side elevational view of another form of the induction motor embodying the present invention;

Fig. 8 is an end elevational view of the left-hand end bell of the other form of the motor shown in Fig. 7;

Fig. 9 is an end elevational view of the right-hand end bell of the other form of the motor shown in Fig. 7;

Fig. 10 is an enlarged side elevational view of one form of the transformer that may be mounted within the right-hand end bell shown in Fig. 9;

Fig. 11 is an enlarged end view of the transformer, taken in the direction of the arrows along the line 11—11 in Fig. 10;

Fig. 12 is a side elevational view of another form of the transformer that may be mounted within the right-hand end bell shown in Fig. 9; and Fig. 13 is and end view of the transformer, taken in the direction of the arrows along the line 13—13 in Fig. 12.

Figure 1:
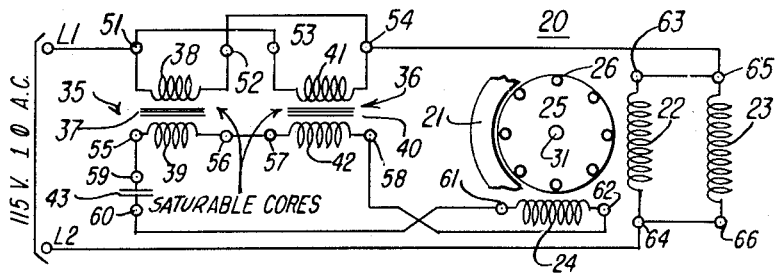
Figure 1 is a first wiring diagram of one form of an induction motor embodying the present invention.

Referring now to Figs. 1 to 6, inclusive, of the drawings, the induction motor 20 there illustrated, and embodying the features of the present invention, comprises a stator 21 provided with angularly displaced main and auxiliary windings, the main winding including two sections respectively indicated at 22 and 23, and the auxiliary winding being indicated at 24, as well as a rotor 25 provided with a squirrel-cage winding 26 having either a high resistance or a low resistance, and preferably of low resistance. Preferably, the main winding 22—23 and the auxiliary winding 24 are arranged in quadrature relation, the main winding sections 22 and 23 being connected in parallel relation for low voltage operation and connected in series relation for high voltage operation.

Also, the motor 20 comprises a supporting frame constituting the central section 27 of an associated casing, that also includes left-hand and right-hand end bells 28 and 29, the central section 27 carrying longitudinal spaced-apart feet 30 accommodating the exterior support of the motor 20. The stator 21 is housed within the central casing section 27, and the rotor 25 is arranged within the stator 21 in the usual manner, the rotor 25 being carried by a longitudinal extending operating shaft 31 supported adjacent to the opposite ends thereof in bearings respectively carried adjacent to the central portions of the end bells 28 and 29, the bearing 32 carried by the right-hand end bell 29 accommodating the projection of the operating shaft 31 to the exterior for the usual drive purpose. Also, the central casing section 27 carries a terminal box 33 housing a terminal board 34 more fully described hereinafter.

Also, the circuit network comprises a transformer that is arranged in two sections respectively indicated at 35 and 36. The transformer section 35 includes a saturable magnetic core 37 carrying primary and secondary windings 38 and 39; and likewise, the transformer section 36 includes a saturable magnetic core 40 carrying primary and secondary windings 41 and 42. In the arrangement, the primary windings 38 and 41 are connected in parallel relation for low voltage operation and in series relation for high voltage operation, as explained more fully hereinafter. Further, the circuit network comprises a capacitor 43 that includes two sections respectively indicated at 43a and 43b in Fig. 4.

Figure 5:
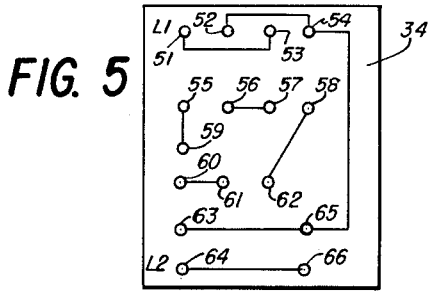
Fig. 5 is an enlarged schematic diagram of the terminal board of the one form of the motor shown in Fig. 3, illustrating the strapping arrangement to obtain the wiring diagram of Fig. 1.
Figure 6:
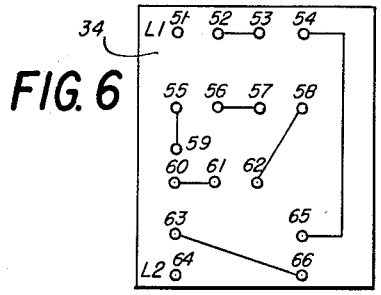
Fig. 6 is another enlarged schematic diagram of the terminal board of the one form of the motor shown in Fig. 3, illustrating the strapping arrangement to obtain the wiring diagram of Fig. 2.

As indicated in Figs. 5 and 6, the terminal board 34 comprises two terminals 51 and 52 respectively terminating the primary winding 38, two terminals 53 and 54 respectively terminating the primary winding 41, two terminals 55 and 56 respectively terminating the secondary winding 39, two terminals 57 and 58 respectively terminating the secondary winding 42, two terminals 59 and 60 respectively terminating the capacitor 43, two terminals 61 and 62 respectively terminating the auxiliary winding 24, two terminals 63 and 64 respectively terminating the main winding 22, and two terminals 65 and 66 respectively terminating the main winding 23.

When the circuit network is connected for low voltage operation, as shown in Fig. 1, the terminal strapping is that shown in Fig. 5; whereby the primary windings 38 and 41 are connected in parallel relation, the main windings 22 and 23 are connected in parallel relation, and the secondary windings 39 and 42 are connected in series relation. More particularly, a primary circuit connectible across the low voltage single-phase alternating current supply source is provided that includes in series relation the parallel connected primary windings 38 and 41 and the parallel connected main windings 22 and 23; and also there is provided a fixed secondary circuit including in series relation the secondary windings 39 and 42, the auxiliary winding 24 and the capacitor 43.

Figure 2:
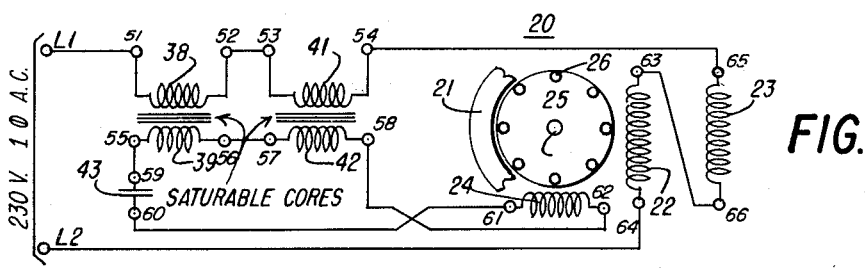
Fig. 2 is a modified wiring diagram of the one form of the motor.
Figure 3:
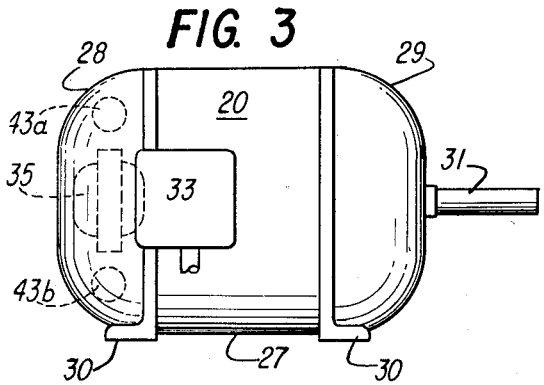
Fig. 3 is a side elevational view of the one form of the motor.

When the circuit network is connected for high voltage operation, as shown in Fig. 2, the terminal strapping is that shown in Fig. 6; whereby the primary windings 38 and 41 are connected in series relation, the main windings 22 and 23 are connected in series relation, and the secondary windings 39 and 42 are connected in series relation. In this case, the primary circuit connectible across the high voltage single-phase alternating current supply source is provided that includes in series relation the primary windings 38 and 41 and the main windings 22 and 23; and the fixed secondary circuit includes in series relation the secondary windings 39 and 42, the auxiliary winding 24 and the capacitor 43.

Figure 4:
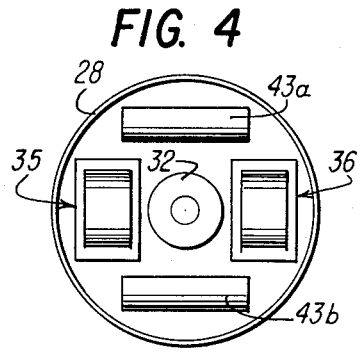
Fig. 4 is an end elevational view of the left-hand end bell of the one form of the motor shown in Fig. 3.

As best illustrated in Fig. 4, the two transformer sections 35 and 36, as well as the two capacitor sections 43a and 43b, are housed within the left-hand end bell 28 and directly supported thereby, so that the left-hand end bell 28 is removable with respect to the central casing section 27, along with the elements 35, 36, 43a and 43b, as a unit, thereby facilitating ready assembly and disassembly of the circuit elements mentioned with the elements of the motor 20. In the arrangement, the capacitor sections 43a and 43b may be of the paper or dry electrolytic type, and may consist of one or more individual cells either of the polarized or non-polarized type. Finally, it is contemplated that the terminal box 33 will be wired via a master switch, not shown, either to the low voltage or the high voltage source of current supply, and that the supply source will comprise a commercial power source having a substantially sinusoidal wave form. In the arrangement, the terminal box 33 is of the closable type protecting the terminals 51, etc., and the associated strapping; while the motor 20 may be either of the totally-closed hermetically sealed type, or of the exteriorly ventilated type. In any case, the arrangement of the transformer sections 35 and 36 and the capacitor sections 43a and 43b within the left-hand end bell 28 protects these elements against accidental injury and lends simplification and compactness to the circuit network.

The motor 20 may be of the fractional horsepower type or may have a rating as high as about 10 H. P.; however, in the illustrated embodiment, the motor 20 has a rating of 1 H. P. and is contemplated as being identical to that disclosed in the previously-mentioned Lewus application. Accordingly, each of the main winding sections 22 and 23 comprises 200 turns, the auxiliary winding 24 comprises 160 turns, each of the primary winding sections 38 and 41 comprises 42 turns, and each of the secondary winding sections 39 and 42 comprises 117 turns; whereby, the two transformer sections 35 and 36 are electrically equivalent to one large transformer, but achieve a more efficient distribution with the available space, as well as better cooling. Hence, the starting and running impedances of the main winding sections 22 and 23 are respectively low and high with respect to each other, so that the magnetic cores 37 and 40 are respectively saturated and unsaturated by the starting and running currents traversing the primary winding sections 38 and 41; whereby the starting and running currents traversing the primary winding sections 38 and 41 induce distorted and peaked starting and substantially sinusoidal running voltages in the secondary winding sections 39 and 42. The starting and running voltages induced in the secondary winding sections 39 and 42 are respectively high and low with respect to each other, and the starting and running impedances of the auxiliary winding 24 are respectively low and high with respect to each other, so that the starting and running currents traversing the auxiliary winding 24 are respectively high and low with respect to each other. The starting current traversing the primary winding sections 38 and 41 maintain saturated the magnetic cores 37 and 40 from stand-still to at least 50% of the normal running speed of the rotor 25, the rotor 25 having a normal running speed at full load of about 1735 R. P. M. and a synchronous speed of 1800 R. P. M.

More particularly, from stand-still to about 50% normal running speed of the rotor 25, there is developed at least 150% normal torque, the starting torque increasing rapidly from this speed to approximately 275% normal torque at 67% of the normal running speed thereof, and then decreasing gradually to 100% normal torque at the normal running speed thereof. The capacitor 43, the two sections 43a and 43b being connected in parallel relation has a relatively small capacitance (about 230 microfarads), and a voltage rating of about 200 volts. The secondary circuit including the auxiliary winding 24, the secondary windings 39 and 42, and the capacitor 43 is substantially series-resonant during saturation of the magnetic cores 37 and 40, so that the capacitor 43 effects a substantial dephasing of the starting current traversing the auxiliary winding 24 with respect to the starting current traversing the main winding sections 22 and 23 in order to produce a substantial starting torque between the stator 21 and the rotor 25, as previously noted. The particular starting and running characteristics of the motor 20 when it is connected for respective low voltage and high voltage operations are disclosed more specifically in the previously-mentioned Lewus application; whereby this data is not set forth herein in detail.

Referring now to Figs. 7 to 11, inclusive, of the drawings, the modified form of the induction motor 120 there illustrated and embodying the features of the present invention is substantially identical to the motor 20 previously described, the motor 120 including the corresponding elements 127, 128, 129, 131 and 133. In this arrangement, the two sections 143a and 143b of the capacitor are preferably housed within and directly supported by the left-hand end bell 128, and the composite transformer 170 is preferably housed within and directly supported by the right-hand end bell 129. The connection and arrangement of the elements of the electric motor 120, the capacitor sections 143a and 143b, and the primary and secondary windings of the composite transformer 170 via the terminal board provided in the terminal box 133 are the same as those previously described in conjunction with the motor 20.

Referring now more particularly to Figs. 10 and 11 of the drawings, the composite transformer 170 is substantially ring-shaped and comprises a saturable magnetic core including complementary sections 171 and 172. The core section 171 is substantially ring-shaped and consists essentially of a continuous punched magnetic ribbon wound into a ring and defining a plurality of pairs of pole-pieces 173 of tooth-like formation; while the core section 172 is substantially ring-shaped and consists essentially of a continuous magnetic ribbon wound into a ring. The core section 172 is suitably secured to the core section 171 so as to bridge the outer ends of the pole-pieces 173 in order to provide a continuous magnetic circuit. Odd ones of the pole-pieces 173 carry adjacent primary and secondary winding sections 174 and 175; whereby even ones of the pole-pieces 173 constitute return magnetic flux paths. While the transformer 170 has been illustrated as comprising four pairs of pole-pieces 173, four primary winding sections 174 and four cooperating secondary winding sections 175, the total number of pairs of pole-pieces and primary-secondary winding sections is subject to substantial design latitude and pertains to the matter of efficient distribution of the primary and secondary windings. Of course, it will be understood that in this modified form of the motor 120 the primary winding sections 174 may be selectively connected in parallel and series relationship in the primary circuit for respectively low voltage and high voltage operations; while the secondary winding sections 175 are connected in series relationship in the secondary circuit; all in the manner described in conjunction with the motor 120.

Referring now more particularly to Figs. 12 and 13 of the drawings, a modified form of the transformer 180 is illustrated that may be employed in the motor 120, instead of the transformer 170. The transformer 180 is essentially of the same construction as that of the transformer 170 described above, except that all of the pole-pieces 183 carry windings, the return magnetic flux paths being eliminated more specifically, in the transformer 180, odd ones of the pole pieces 183a constitute north poles and even ones of the pole-pieces 183b constitute south poles; and each of the pole-pieces carries primary and secondary winding sections 184 and 185.

The principle of operation of the motor 120 is identical to that of the motor 20, previously described, and is not reiterated in the interest of brevity.

In view of the foregoing, it is apparent that there has been provided an induction motor of the capacitor type incorporating a circuit network including both a capacitor and a transformer, wherein the capacitor and the transformer are housed within the casing of the motor in order to provide a compact and efficient circuit network and to protect these elements against accidental injury and damage due to exposure.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an induction motor including a stator provided with angularly displaced main and auxiliary windings, a rotor provided with a squirrel-cage winding, an operating shaft supporting said rotor in cooperating relation with said stator, and a casing supporting said operating shaft and housing said stator and said rotor; the combination comprising a composite transformer housed within said casing and provided with a plurality of sections distributed about said operating shaft, each of said transformer sections having primary and secondary winding sections, a capacitor housed within said casing, a primary circuit connecting in series relation said main winding and said primary winding sections, a secondary circuit connecting in series relation said auxiliary winding and said secondary winding sections and said capacitor, strapping terminals carried by said casing and terminating said primary winding sections and accommodating selective series and parallel strapping thereof with respect to each other in said primary circuit, and supply terminals carried by said casing and terminating said primary circuit and accommodating the connection thereto of a single-phase alternating current supply source.

2. In an induction motor including a stator provided with angularly displaced main and auxiliary windings, a rotor provided with a squirrel-cage winding, an operating shaft supporting said rotor in cooperating relation with said stator, a casing provided with a central body and a pair of end bells and housing said stator and said rotor and at least a portion of said operating shaft, and a pair of bearings respectively carried by said end bells and respectively supporting the opposite ends of said operating shaft; the combination comprising a composite transformer housed within one of said end bells and directly supported thereby and provided with a plurality of sections distributed about said operating shaft, each of said transformer sections having primary and secondary winding sections, a capacitor housed within said casing, a primary circuit connecting in series relation said main winding and said primary winding sections, a secondary circuit connecting in series relation said auxiliary winding and said secondary winding sections and said capacitor, strapping terminals carried by said casing and terminating said primary winding sections and accommodating selective series and parallel strapping thereof with respect to each other in said primary circuit, and supply terminals carried by said casing and terminating said primary circuit and accommodating the connection thereto of a single-phase alternating current supply source.

3. In an induction motor including a stator provided with angularly displaced main and auxiliary windings, a rotor provided with a squirrel-cage winding, an operating shaft supporting said rotor in cooperating relation with said stator, a casing provided with a central body and a pair of end bells and housing said rotor and at least a portion of said operating shaft, and a pair of bearings respectively carried by said end bells and respectively supporting the opposite ends of said operating shaft; the combination comprising a composite transformer housed within one of said end bells and directly supported thereby and provided with a plurality of sections distributed about said operating shaft, each of said transformer sections having primary and secondary winding sections, a capacitor housed within said casing, a primary circuit connecting in series relation said main winding and said primary winding sections, a secondary circuit connecting in series relation said auxiliary winding and said secondary winding sections and said capacitor, and a terminal box carried by said central body and housing strapping terminals terminating said primary winding sections and accommodating selective series and parallel strapping thereof with respect to each other in said primary circuit and supply terminals terminating said primary circuit and accommodating the connection thereto of a single-phase alternating current supply source.

4. In an induction motor including a stator provided with angularly displaced main and auxiliary windings, a rotor provided with a squirrel-cage winding, an operating shaft supporting said rotor in cooperating relation with said stator, a casing provided with a central body and a pair of end bells and housing said stator and said rotor and at least a portion of said operating shaft, and a pair of bearings respectively carried by said end bells and respectively supporting the opposite ends of said operating shaft; the combination comprising a transformer housed within one of said end bells and directly supported thereby and provided with primary and secondary windings, a capacitor housed within said casing, a primary circuit connecting in series relation said main winding and said primary winding, a secondary circuit connecting in series relation said auxiliary winding and said secondary winding and said capacitor, and terminals carried by said casing and terminating said primary circuit and accommodating the connection thereto of a single-phase alternating current supply source; wherein said transformer housed within and directly supported by said one end bell is substantially ring-shaped and surrounds the adjacent end of said operating shaft.

5. In an induction motor including a stator provided with angularly displaced main and auxiliary windings, a rotor provided with a squirrel-cage winding, an operating shaft supporting said rotor in cooperating relation with said stator, a casing provided with a central body and a pair of end bells and housing said stator and said rotor and at least a portion of said operating shaft, and a pair of bearings respectively carried by said end bells and respectively supporting the opposite ends of said operating shaft; the combination comprising a transformer housed within one of said end bells and directly supported thereby and provided with primary and secondary windings, a capacitor housed within said casing, a primary circuit connecting in series relation said main winding and said primary winding, a secondary circuit connecting in series relation said auxiliary winding and said secondary winding and said capacitor, and terminals carried by said casing and terminating said primary circuit and accommodating the connection thereto of a single-phase alternating current supply source; wherein said transformer includes a substantially ring-shaped magnetic core provided with a plurality of pole-pieces, and said primary and secondary windings are arranged in a plurality of sections carried by said pole-pieces and distributed about said magnetic core.

6. The induction motor combination set forth in claim 5; and wherein said magnetic core is of wound continuous magnetic ribbon construction, and said winding sections are carried by only odd ones of said pole-pieces so that even ones of said pole-pieces constitute return magnetic paths.

7. The induction motor combination set forth in claim 5; and wherein said magnetic core is of wound continuous magnetic ribbon construction, and said winding sections are carried by both odd and even ones of said pole-pieces so that adjacent ones of said pole-pieces carrying winding sections are of opposite polarity.

References Cited in the file of this patent
UNITED STATES PATENTS

| | | |
|---|---|---|
| 1,844,093 | Kennedy | Feb. 9, 1932 |
| 2,646,537 | Lewus | July 21, 1953 |